Oct. 27, 1942.    K. L. JOHNSON    2,299,752
FASTENER
Filed March 8, 1940
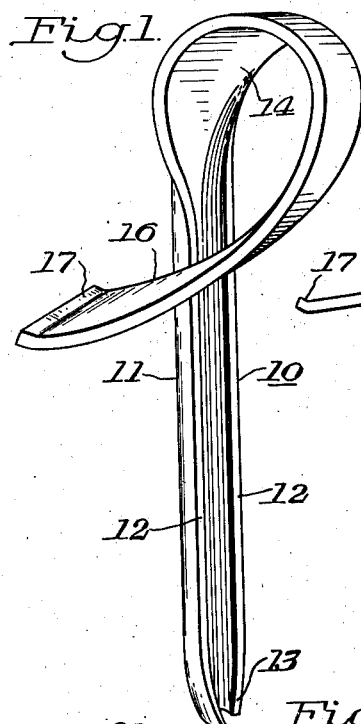
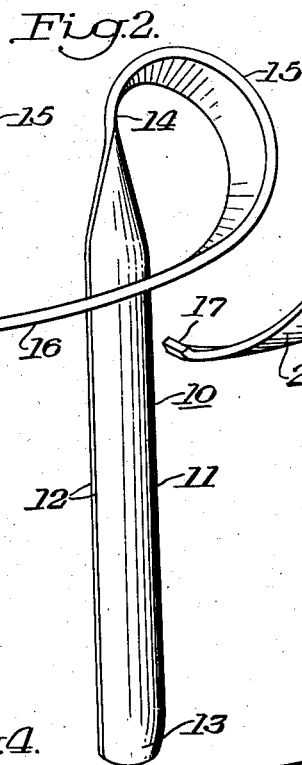
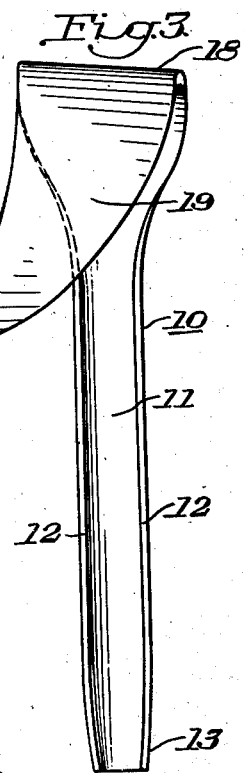
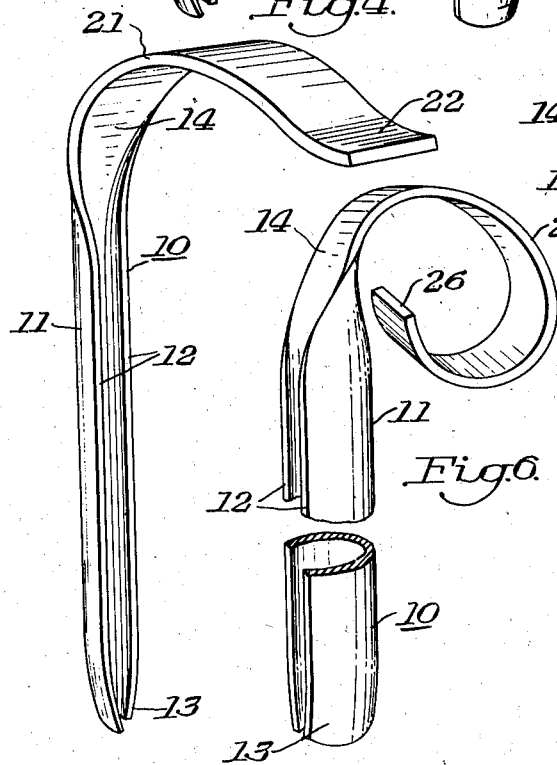
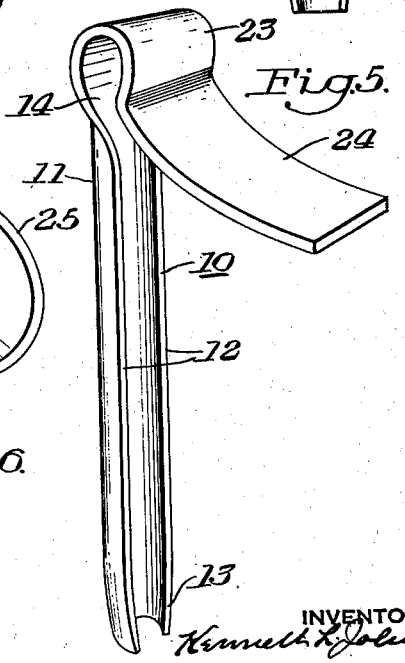
INVENTOR
Kenneth L. Johnson.
BY
Edward A. Lawrence.
ATTORNEY Patented Oct. 27, 1942

2,299,752

UNITED STATES PATENT OFFICE 2,299,752

FASTENER

Kenneth L. Johnson, Sewickley, Pa.

Application March 8, 1940, Serial No. 322,944

5 Claims. (Cl. 85—10)

This invention relates generally to fasteners and more particularly to fastenings designed to be driven into one member by repeated blows and having a resilient head and clamp and arranged to engage and secure another member thereto.

This invention may be conveniently applied for securing railroad rails, plates, and track castings on supporting members such as cross-ties. Again these fasteners may be used in fabricated wood or metal structure as a substitute for nails, bolts, and the like. The fastener may be employed in machines for holding a slidable member against movement until after a predetermined pressure has been applied thereto.

A resilient fastener consists of a shank portion and an integral head portion having a leg extending laterally of the shank and arranged to engage the member to be fastened when the shank is inserted into the anchored member. The resiliency of the fastener is obtained by the form of the leg and head portions of which there are a number of types.

The resilient fasteners comprising this invention are formed from relatively wide strip material, the dimensions of which are maintained uniform throughout the shank, the head and the leg portions. Other types of resilient fasteners have been made from bar material, the original cross section of which is substantially square and the head and leg portions are formed by flattening one end of the bar in a separate forging operation. The flattened portion of the bar is then formed into a head and leg portion by bending the metal into the desired shape.

In this improvement the load characteristics of the resilient type of fastener are dependent upon the dimension of the strip making up the head and leg portions, assuming that the other factors, such as the character of metal or steel and the heat treating process, are the same.

The principal object of this invention is the provision of a fastener which will produce a higher load per unit deflection than the present type of resilient fastener.

Another object is the provision of a fastener made from strip material which may readily be driven into an anchored member and with a high load per unit of deflection.

Another object is the provision of a fastener made from relatively wide strip material and having a uniform cross sectional area throughout the length of the shank, head and leg portions.

Other objects and advantages appear in the following description and claims.

In the accompanying drawing a practical embodiment illustrating the principles of this invention is shown wherein:

Fig. 1 is a perspective view of a resilient fastener comprising this invention, the fastener being made from a relatively wide strip of uniform cross sectional area throughout its length with the shank having a materially less overall width than the head and leg portions, and the head being formed in the shape of a loop.

Fig. 2 is a side elevation of a fastener similar to that shown in Fig. 1 with the open side of the shank facing the opposite direction.

Fig. 3 is a side elevation of a fastener made from a strip similar to that shown in Fig. 1, the head being formed by bending the material over to one side and downwardly and then twisting it toward the shank and bending it upwardly so that the leg extends laterally.

Fig. 4 is a perspective view illustrating a resilient fastener made from a strip similar to that shown in Fig. 1, the head being formed by bending the material over to one side and slightly downwardly to form the leg.

Fig. 5 is a perspective view illustrating a resilient fastener made from a strip similar to that shown in Fig. 1, the head being formed by bending the material over and downwardly to one side, forming an eye, and then being bent upwardly to form the leg.

Fig. 6 is a perspective view of a fastener made from a strip similar to that shown in Fig. 2, the head being formed by bending the material over in the shape of a spiral, the bottom of the curve providing the member engaging portion.

Referring to the drawing, each fastener illustrated is made from the same character of strip 10 and the views differ only in manner in which the head and leg portions are formed. This strip 10 may have the approximate dimensions of three-sixteenths of an inch thick and one and one-half inches wide. The length of the strip varies in accordance with the character of head and leg to be formed and the use for which it is intended.

That part of the strip 10 which forms the shank 11 is made by bending the longitudinal edges 12 toward one another, producing a partially enclosed cross sectional shape such as open tubular, U or C shape, depending upon the width of the strip and the conventional size of the hole into which the shank is to be driven. The edges may be in close proximity and they may even overlap. The sides of the channel forming the lower end of the shank are pinched together to produce a suitable driving point indicated at 13.

Referring to the loop head structure, which is illustrated in Fig. 1, the sides 12 which form the channel gradually curve out to the full dimension of the strip as indicated at 14. The stock curves smoothly from the upper end of the shank 11 into the looped head 15. The head is helical in shape, which permits the leg 16 to pass down to one side of the shank and to the front of the fastener. The end of the leg may be slightly turned upwardly to form a toe as indicated at 17.

The fastener shown in Fig. 2 is similar in character to that illustrated in Fig. 1 except that the open side of the shank faces the front of the fastener. By facing this side to the front of the fastener a distinct line is formed across the width of the strip at 14 where the sides 12, which edge the opening, emerge to the full width of the material and where the loop of the head 15 is started. The curve of the head of this fastener approaches that of a spiral, as the curvature appears to be more abrupt adjacent the end of the shank.

The leg in each of these two forms of the fastener preferably crosses the shank below the point where the sides 12 begin to flare outwardly to the full width of the strip. Thus ample room is provided for the flexing of the leg under load without interference with the shank.

The head of the fastener shown in Fig. 3 is not a loop. This head is formed by bending the upper portion of the strip 10 over to one side and down, with the crest of the bend along a transverse line 18 extending across the broad dimension of the stock. The depending portion is then twisted toward the shank as at 19 and bent upwardly and outwardly to one side so that the free end or leg portion 20 is preferably disposed approximately thirty degrees to the horizontal. The neutral axis of the leg 20 is substantially parallel to the line 18 which may be said to lie in the former plane of the broad dimension of the stock making up the shank. The under face of the leg is a portion of the same side surface which forms the top of the head and the surface on the opposite side of the shank.

As in the other forms the crest of the first bend or the top of the head is the impact receiving surface of the fastener. In this particular form this surface is closely adjacent the axial center of the shank which permits the fastener to be readily driven into the anchored member.

The outer end of the leg may also be turned upwardly to produce the toe 17. If it is desired, the end of the leg portions of each of these three types of fasteners may be left in their normal plane so that they will gouge into the member being fastened to hold it against movement in the direction of the leg. If the fastener is employed as a rail spike this action may be employed as a rail anchor.

The head of the fastener illustrated in Fig. 4 is formed by bending the upper portion of the strip to one side in an arc as shown at 21. The outer end 22 of the leg is bent slightly in a reverse curve and forms the member engaging portion.

The head of the fastener shown in Fig. 5 is bent over, then downwardly and inwardly to form the eye 23. The leg 24 is then formed by bending the stock upwardly. This leg is bent slightly arcuate.

The head of the fastener shown in Fig. 6 is formed by bending the upper portion of the strip over and downwardly in a spiral 25 with the free end 26 turned upwardly and in spaced relation from the shank. The bottom or under side of the spiral is the member engaging portion of the head. The channel of the shank 11 is faced on the opposite side of the fastener than the head, which is the same arrangement as that shown in Fig. 2. It apparently does not make any difference which side the channel faces.

Of these different forms of fastener heads, those illustrated in the first three figures are preferable. However in each instance the point of application of the load to the fastener is spaced from the axial center of the shank. This load will deflect the leg and the resilient head. It also tends to bend the shank away from the point of load application. If the shank were not bent along its longitudinal axis but was flat it would bend at the point where it enters the hole, whether this hole is in the anchored member or the member to be fastened. The action of these forces tending to bend the shank is checked by stiffening the shank. In this improvement it is accomplished by bending the longitudinal edges 12 until the cross section preferably forms in a U or C. This provides sufficient rigidity to resisting the bending moments and also permits the use of a relatively broad strip in making up the fastener, thereby producing a resilient head and leg that has a higher load per unit deflection than a fastener made from a strip of the same thickness but of materially less width. The load per unit deflection for each character of fastener made from a given thickness is proportional to the width of the strip from which the resilient parts are formed. The form of the shank also permits the fastener made of relatively wide stock to be driven through conventionally sized holes, such as provided in a tie plate.

Since the application of the load is spaced from the shank and has a tendency to rotate the fastener about a horizontal axis through the shank adjacent the point where it enters the hole, this action of the bending moments increases the frictional engagement of the shank in the member into which it is driven in proportion to the load applied.

Thus the load does not tend to lift the shank out of the hole or from its socket and only a few pounds is all that is initially required to hold the fastener as it is being driven into place. Vibration will not loosen the shank after it has been set. The fastener is driven sufficiently deep to apply the proper load and any increased load due to vibration or flexure of the member fastened merely flexes the resilient head and leg. The fastener is applied in such a manner that additional flexure of the leg and head will not work the metal beyond its elastic limit. If it did the form of the head would take a new set and the degree of change would be proportional to the excess load.

The curved shank may be formed in the strip material when it is in one long continuous piece by passing it through rollers having an interrupted rotary die in the perimetral surface thereof. The cross sectional shape is thus formed at spaced intervals representing adjacent shank portions of successive fasteners disposed end to end. The flat sections of the strip between adjacent bent sections provide the material out of which the heads and legs are to be formed for the several fasteners. The strip is then cut into the proper lengths for producing the fasteners and the heads and legs are formed and shaped in a die.

These fasteners may also be formed by feeding a long strip to a die in a forging machine which cuts the proper length, bends the shank and forms the head and leg in one, or in some instances two, operations which may be successive.

After the fastener has been formed it is heat treated. The physical dimensions and the shape of the fastener together with the heat treatment permits full advantages of the properties of the steel with minimum amount of metal and maximum results. The thinness of the strip permits accurate control with strict uniformity in the heat treating process, which is not obtainable with thick cross sections of steel of equivalent areas.

By making the fastener from strip material it is comparatively light weight and is economical to manufacture. The stresses created by fastening one object to another are resisted by substantially uniform flexure in the correctly contructed resilient section and stress concentration at any one point is avoided, thereby producing substantial uniformity per unit deflection while applying a high static pressure. This load deflection is also proportional to the width of the material for given thicknesses.

An important advantage of the improved fastener which forms the subject matter of the present application arises from the fact that it can be cheaply made from a rolled flat steel strip or bar having uniform thickness and width, employing the full overall width of the parent strip for the leg, which engages the rail flange from above, and to provide for the maximum load per unit deflection, while the portion of the strip which forms the shank is at minimum expense bent up or curved along its longitudinal axis to such cross sectional shape as to permit its being driven through the spike holes of a standard rail plate, which holes are rectangular and usually square and of such dimensions as to preclude the passage therethrough of the overall width of the parent strip.

These fasteners are readily removed by inserting the jaw of a puller under the head on the upper portion of the shank and prying it out of the anchored member, yet they will not pull out due to vibration when they are properly set.

I claim:

1. A resilient steel fastener of the character described formed of a strip of flat metal of substantially uniform cross-sectional shape and of materially greater width than thickness, and consisting of a head and an overhanging portion integral therewith and of the full original width of the strip, and a shank of longitudinal channel form and of materially less overall width but of the same cross-sectional area as the original strip adapted for driving into a support such as a railway tie.

2. A resilient steel fastener of the character described formed of a strip of flat metal of substantially uniform cross-sectional shape and of materially greater width than thickness, and consisting of a head and an overhanging portion integral therewith and of the full original width of the strip, and a shank of longitudinal channel form and of materially less overall width but of the same cross-sectional area as the original strip adapted for driving into a support such as a railway tie, said channel form merging into the original cross-sectional shape of the strip between the point of maximum bending and the head.

3. A resilient steel fastener of the character described formed of a strip of flat metal of substantially uniform cross-sectional shape and of materially greater width than thickness, consisting of a head and an overhanging portion integral therewith of the original width of the strip, and having a longitudinally channeled shank of substantially the same cross-sectional area but of materially less overall width than the overhanging portion and adapted for driving in a support such as a railway tie, said channel form merging into the original cross-sectional shape of the strip above the region of maximum bending.

4. A resilient steel fastener of the character described formed of a strip of flat metal of substantially uniform cross-sectional shape and of materially greater width than thickness, and consisting of a head and an overhanging portion integral therewith and of the full original width of the strip, and a shank bent longitudinally of its axis to a materially less overall width than that of the head and overhanging portion but of the same cross-sectional area, the metal in the shank being of uniform thickness and adapted for driving a support such as a railway tie.

5. A resilient steel fastener of the charcter described formed of a strip of flat metal of substantially uniform cross-sectional shape and of materially greater width than thickness, and consisting of a head and an overhanging portion integral therewith and of the full original width of the strip, and a shank bent longitudinally of its axis in a partially enclosed cross-sectional shape to a materially less overall width than that of the head and overhanging portion but of the same cross-sectional area, the metal in the shank being of uniform thickness and adapted for driving into a support such as a railway tie.

KENNETH L. JOHNSON.